(12) United States Patent
Page et al.

(10) Patent No.: US 6,733,187 B2
(45) Date of Patent: May 11, 2004

(54) CONNECTOR ASSEMBLIES FOR FIBER OPTIC LIGHT CABLES AND METHOD OF MAKING SAME

(75) Inventors: David J. Page, Painesville, OH (US); Paul E. McCreight, Seven Hills, OH (US)

(73) Assignee: Lumitex, Inc., Strongsville, OH (US)

( * ) Notice: Subject to any disclaimer, the term of this patent is extended or adjusted under 35 U.S.C. 154(b) by 13 days.

(21) Appl. No.: 09/933,352

(22) Filed: Aug. 20, 2001

(65) Prior Publication Data

US 2003/0039450 A1 Feb. 27, 2003

(51) Int. Cl.[7] .................................................. G02B 6/36
(52) U.S. Cl. ........................................ 385/78; 385/76
(58) Field of Search ............................. 385/76, 78, 123

(56) References Cited

U.S. PATENT DOCUMENTS

| | | | |
|---|---|---|---|
| 3,655,275 A | * 4/1972 | Seagreaves | 385/53 |
| 4,092,396 A | * 5/1978 | McCartney et al. | 264/249 |
| 4,907,132 A | 3/1990 | Parker | 362/32 |
| 5,042,900 A | 8/1991 | Parker | 385/76 |
| 5,390,269 A | * 2/1995 | Palecek et al. | 385/78 |
| 5,737,471 A | * 4/1998 | Sugiyama et al. | 385/123 |
| 6,416,234 B1 | * 7/2002 | Wach et al. | 385/70 |

* cited by examiner

Primary Examiner—Drew Dunn
Assistant Examiner—Joshua L Pritchett
(74) Attorney, Agent, or Firm—Renner, Otto, Boisselle & Sklar LLP

(57) ABSTRACT

Connector assemblies for tightly compacting end portions of a bundle of optical fibers together include a plastic tube surrounding the optical fiber end portions and a metal ferrule surrounding the plastic tube. The metal ferrule is crimped to maintain a compression force on the optical fiber end portions while the plastic tube acts as a buffer to prevent damage to the optical fiber end portions by the metal ferrule and is stiff enough to prevent the compression force from causing the optical end portions to sink into the plastic tube blocking light entering the optical fiber end portions.

12 Claims, 2 Drawing Sheets

US 6,733,187 B2

CONNECTOR ASSEMBLIES FOR FIBER OPTIC LIGHT CABLES AND METHOD OF MAKING SAME

FIELD OF THE INVENTION

This invention relates to connector assemblies used to provide an interface between a remote light source and the end portions of fiber optic light cables and the like and to the method of making such connector assemblies.

BACKGROUND OF THE INVENTION

It is generally known to provide connector assemblies on the end portions of fiber optic light cables to provide an interface between a remote light source and the optical fiber end portions for transmitting light from the remote light source through the cables. Such connector assemblies commonly include a metal tube or ferrule made of brass or other malleable material that is crimped around the optical fiber end portions to provide a compressive force on such end portions causing such end portions to be tightly pressed together. In addition, a buffer material made for example of Teflon is interposed between the metal ferrule and optical fiber end portions to protect the fibers against damage by the metal ferrule. Connector assemblies of this general type are disclosed for example in U.S. Pat. Nos. 4,885,663, 4,907,132 and 5,042,900, the entire disclosures of which are incorporated herein by reference.

A drawback to such connector assemblies is that heretofore it has been very difficult to obtain the most effective packing of the fiber optic strands allowing for maximum inception of light into the fiber optic light cables and minimum damage to the individual fibers.

SUMMARY OF THE INVENTION

The present invention relates to connector assemblies for fiber optic light cables that are formed by press fitting a plastic tube having a predetermined inner diameter into a metal tube or ferrule and then crimping the connector assemblies onto the end portions of the optical fibers to create a compression force on the optical fibers to maintain the optical fiber end portions densely packed together. The inner diameter (ID) of the plastic tube is determined by the following formula to maintain the most effective packing of the optical fiber end portions allowing for maximum inception of light into the end portions and minimum damage to the individual fibers:

$$ID = \text{Fiber Diameter} \times \sqrt{\frac{\text{Number of Fibers}}{\text{Packing Factor}}},$$

where the fiber diameter can be any diameter from 0.010" to 0.120" and the Packing Factor (P.F.) can be any number between 0.92 and 0.75.

Determining the inner diameter of the plastic tube using this formula allows one size plastic tube to be used to make connector assemblies for multiple fiber optic bundles. The plastic tube buffers the optical fiber end portions from the metal ferrule thus preventing damage to the optical fiber end portions. At the same time, the plastic tube is made stiff enough to prevent the end portions of the individual optical fibers from sinking into the plastic tube and blocking light. Preferably the coefficient of expansion and contraction of the plastic tube is similar to that of the optical fibers to minimize walking of the connector assemblies on the optical fiber end portions every time the light source is turned on and off.

To the accomplishment of the foregoing and related ends, the invention, then, comprises the features hereinafter more fully described and particularly pointed out in the claims, the following description and annexed drawings setting forth in detail a certain illustrative embodiment of the invention, this being indicative, however, of but one of the various ways in which the principles of the invention may be employed.

DETAILED DESCRIPTION OF THE INVENTION

Figure 1:
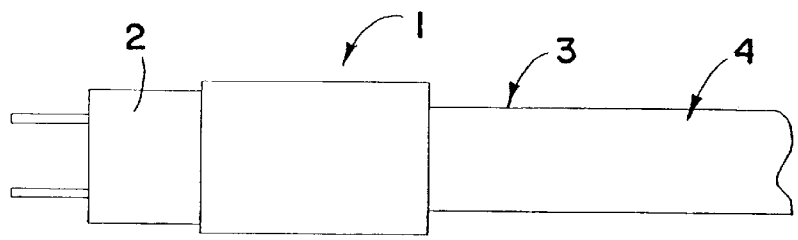
FIG. 1 is a schematic side elevation view of one form of connector assembly in accordance with this invention mounted on the end portions of a bundle of optical fibers to provide an interface between a remote light source and the optical fiber end portions.

Referring now in detail to the drawings, FIG. 1 shows one form of connector assembly 1 of the present invention providing an interface between a remote light source 2 and the adjacent end portions of a bundle 3 of optical fibers forming an optical fiber cable 4 through which light from the light source is transmitted. As shown in greater detail in FIGS. 2 and 3, connector assembly 1 includes a plastic tube 5 and surrounding metal tube or ferrule 6 that is crimped onto the end portions 7 of a bundle 3 of optical fibers 8 to create and maintain a compression force to hold the optical fiber end portions densely packed together to minimize air gaps therebetween allowing for maximum inception of light while preventing the end portions from being crushed to the degree of restricting light input as described hereafter.

Figure 4:
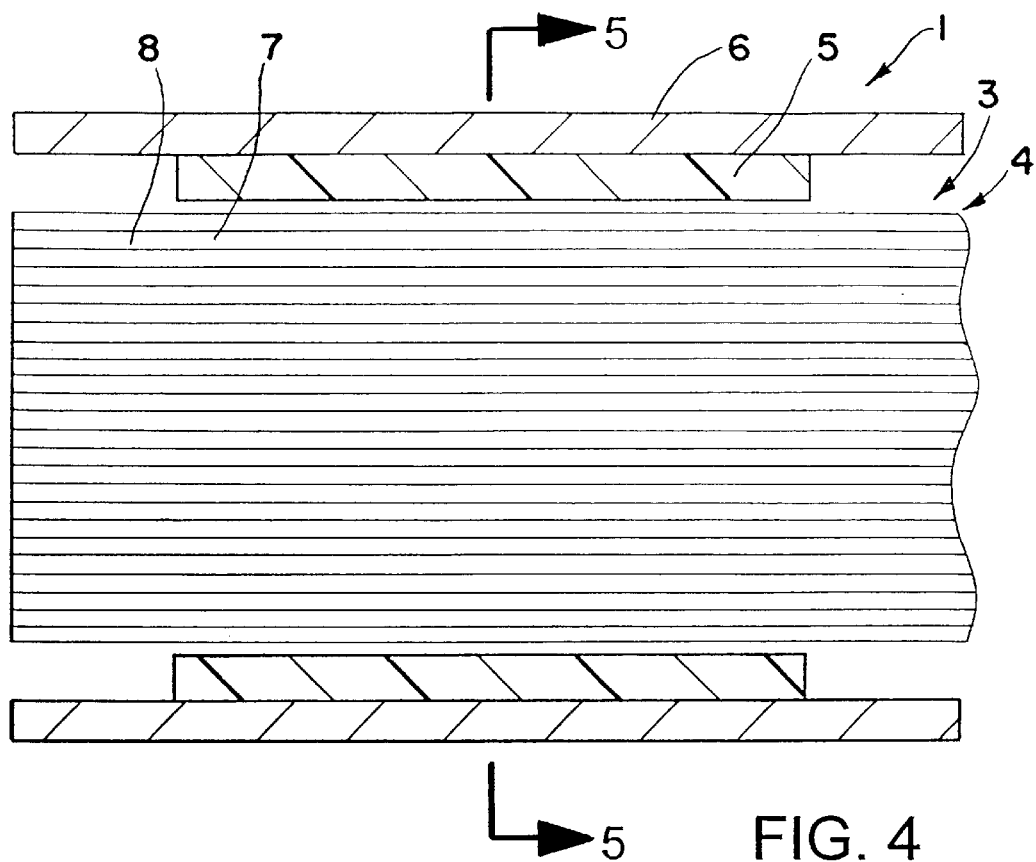
FIG. 4 is an enlarged schematic longitudinal section through the connector assembly similar to FIG. 3 but before the connector assembly is crimped onto the optical fiber end portions.
Figure 5:
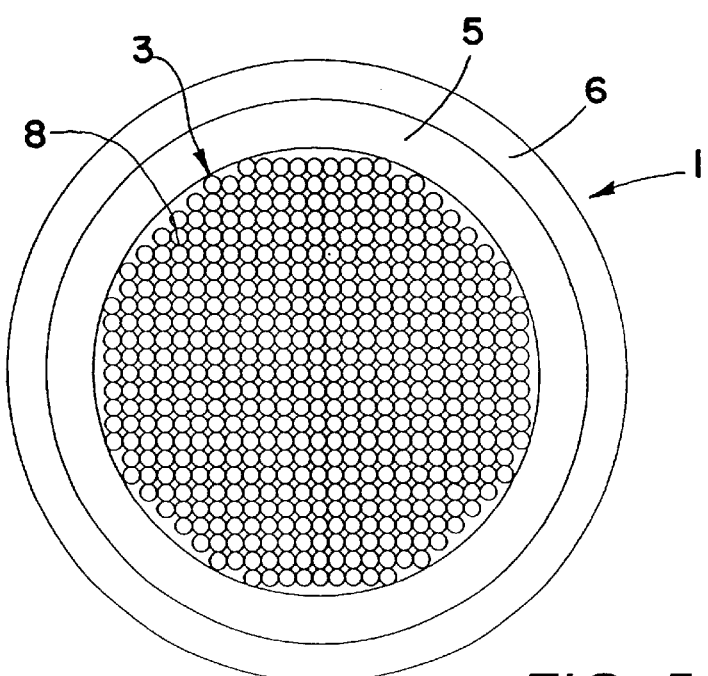
FIG. 5 is a transverse section through the connector assembly of FIG. 4 prior to crimping taken generally on the plane of the line 5—5 thereof.

Metal ferrule 6 is made of brass or other suitable malleable material, whereas plastic tube 5 is made of white or clear polycarbonate or other suitable plastic that has been extruded, molded or machined. The outer diameter of the plastic tube 5 may be selected from a series of "standard sizes", minimizing the number of metal ferrule sizes needed to be stocked. The outer diameter of the plastic tube should closely match the inner diameter of the metal ferrule 6 to permit the plastic tube to be press fitted into the metal ferrule prior to crimping the connector assembly onto the end portions of the fiber optic bundle. FIGS. 4 and 5 schematically show the plastic tube 5 press fitted into the metal ferrule 6 and inserted over the optical fiber end portions 7 of a bundle of optical fibers 8 prior to crimping the connector assembly 1 onto end portions.

The inner diameter (ID) of the plastic tube 5 is preferably determined by the following formula:

$$ID = \text{Fiber Diameter} \times \sqrt{\frac{\text{Number of Fibers}}{\text{Packing Factor}}},$$

where the fiber diameter can be any diameter from 0.010" to 0.120" and the Packing Factor (P.F.) can be any number between 0.92 and 0.75.

It has been found that determining the inner diameter of the plastic tube 5 using this formula allows one size plastic tube to be used to make connector assemblies for multiple optical fiber bundles in a mass production environment to maintain the most effective packing of the optical fiber end portions allowing for maximum inception of light and minimum damage to the individual fibers. The plastic tube 5 buffers the optical fibers 8 from the metal ferrule 6 thus preventing the metal ferrule 6 from damaging the individual fibers. At the same time, the plastic tube 5 is stiff enough to prevent the end portions of the individual fibers from sinking into the plastic tube and blocking light entering the individual fibers. Also, the plastic tube 5 has a coefficient of expansion and contraction that is similar to the optical fibers 8 to minimize walking of the connector assembly on the optical fiber bundle end portions 7 every time the light source 2 is turned on and off.

The diameters of the metal ferrule 6, plastic tube 5 and optical fiber end portions 7 are generally concentric to allow for optimum alignment and focus of the remote light source 2 onto the forwardmost ends of the optical fiber end portions.

Figure 2:
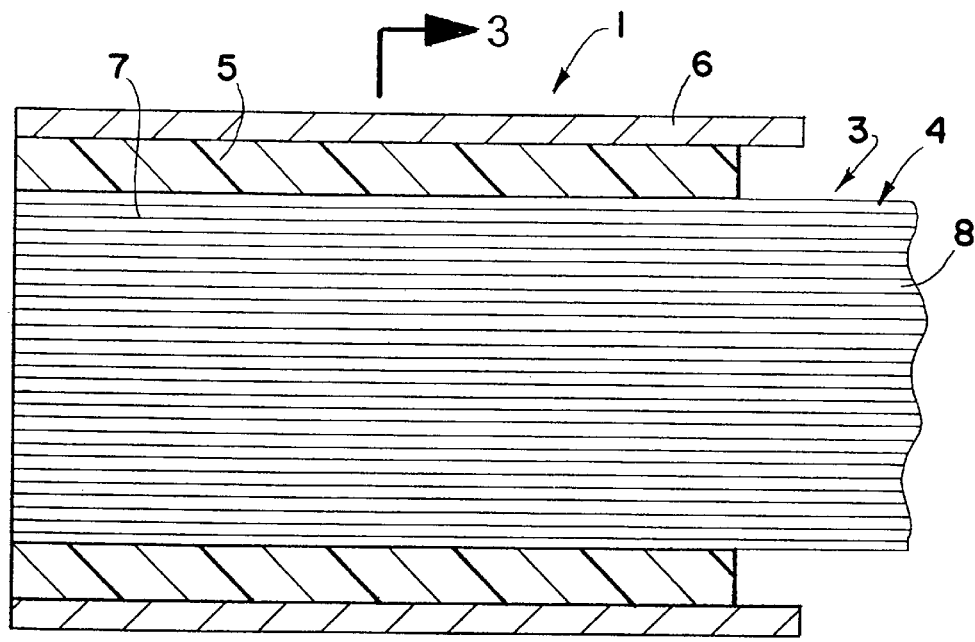
FIG. 2 is an enlarged schematic longitudinal section through the connector assembly of FIG. 1.
Figure 3:
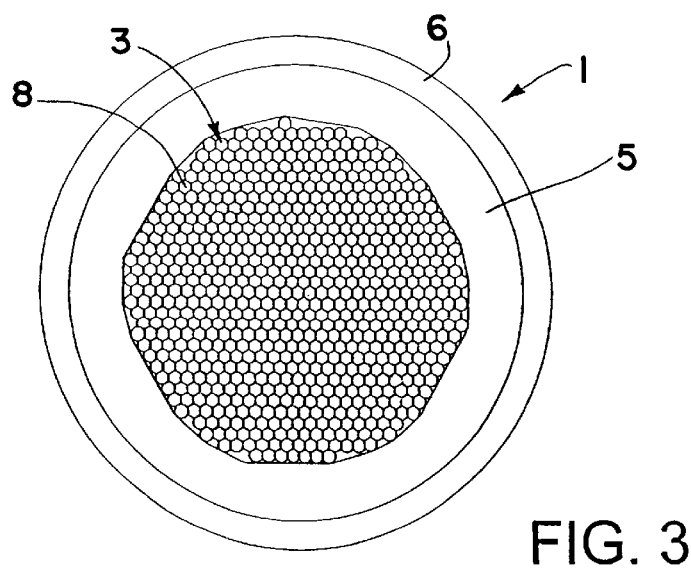
FIG. 3 is a transverse section through the connector assembly of FIG. 2 taken generally on the plane of the line 3—3 thereof.

During the compression process, the plastic tube 5 will expand in length. Accordingly, the initial length of the plastic tube 5 is desirably sufficiently less than the length of the metal ferrule 6 prior to crimping as schematically shown in FIGS. 4 and 5 so that as the plastic tube expands in length during the compression process, the plastic tube will not extend beyond the back end of the metal ferrule, but will extend slightly beyond the front end of the metal ferrule as schematically shown in FIGS. 2 and 3. Any excess length of the plastic tube (and optical fiber end portions 7) extending beyond the front end of the metal ferrule will be trimmed off, and the front end of the metal ferrule, the forward edge of the plastic tube, and the forwardmost ends of the optical fiber end portions will be polished for maximum optical interface efficiency.

Although the invention has been shown and described with respect to a certain embodiment, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs a specified function of the described component (e.g., that is functionally equivalent), even though not structurally equivalent to the disclosed component which performs the function in the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. A connector assembly for tightly compacting end portions of a bundle of optical fibers together comprising a plastic tube surrounding the optical fiber end portions, and a metal ferrule surrounding the plastic tube, the metal ferrule being crimped to maintain a compression force on the optical fiber end portions causing the optical fiber end portions to be closely packed together, the plastic tube acting as a buffer to prevent damage to the optical fiber end portions by the metal ferrule, the plastic tube being sufficiently stiff to prevent the compression force from causing the optical fiber end portions to sink into the plastic tube blocking light entering the optical fiber end portions, the plastic tube having a back edge that terminates short of a back end of the metal ferrule.

2. The connector assembly of claim 1 wherein the plastic tube has a forward edge in line with a front end of the metal ferrule and forwardmost ends of the optical fiber end portions which are all polished to a desired finish.

3. The connector assembly of claim 1 wherein the metal ferrule is made of brass.

4. The connector assembly of claim 1 wherein the plastic tube is made of white or clear polycarbonate.

5. The connector assembly of claim 1 wherein the plastic tube has an initial length that is less than the length of the metal ferrule to allow the plastic tube to expand in length during crimping of the metal ferrule onto the optical fiber end portions without protruding beyond a back end of the metal ferrule and protruding only slightly beyond a front end of the metal ferrule.

6. A connector assembly for tightly compacting end portions of a bundle of optical fibers together comprising a plastic tube surrounding the optical fiber end portions, and a metal ferrule surrounding the plastic tube, the metal ferrule being crimped to maintain a compression force on the optical fiber end portions causing the optical fiber end portions to be closely packed together, the plastic tube acting as a buffer to prevent damage to the optical fiber end portions by the metal ferrule, the plastic tube being sufficiently stiff to prevent the compression force from causing the optical fiber end portions to sink into the plastic tube blocking light entering the optical fiber end portions, the plastic tube having an inner diameter (ID) that is determined by the following formula that allows one size plastic tube to be used to make densely packed connector assemblies for multiple fiber optic bundles having different fiber diameters:

$$ID = \text{Fiber Diameter} \times \sqrt{\frac{\text{Number of Fibers}}{\text{Packing Factor}}},$$

wherein the fiber diameter is between 0.010" to 0.120" and the Packing Factor is between 0.92 and 0.75.

7. A connector assembly for use in maintaining end portions of a bundle of optical fibers densely packed together comprising a metal ferrule and a plastic tube press fitted inside the metal ferrule, the plastic tube having an initial length less than the length of the metal ferrule to allow for expansion of the plastic tube during crimping of the metal ferrule around the optical fiber end portions without protruding beyond a back end of the metal ferrule and protruding only slightly beyond a front end of the metal ferrule.

8. The connector assembly of claim 7 wherein the plastic tube is sufficiently stiff to prevent a compressive force that is created during crimping of the metal ferrule onto the optical fiber end portions from causing the optical fiber end portions to sink into the plastic tube.

9. The connector assembly of claim 7 wherein the plastic tube is made of white or clear polycarbonate.

10. The connector assembly of claim 7 wherein the plastic tube has an inner diameter (ID) that is determined by the following formula that allows one size plastic tube to be used to make densely packed connector assemblies for multiple fiber optic bundles having different fiber diameters:

$$ID = \text{Fiber Diameter} \times \sqrt{\frac{\text{Number of Fibers}}{\text{Packing Factor}}},$$

wherein the fiber diameter is between 0.010" to 0.120" and the Packing Factor is between 0.92 and 0.75.

11. A method of attaching a connector assembly to end portions of a bundle of optical fibers to maintain the optical fiber end portions densely packed together without damaging the optical fiber end portions comprising the steps of press fitting a plastic tube inside a metal ferrule, placing the metal ferrule with plastic tube inside the metal ferrule around the optical fiber end portions, applying a crimping force to the metal ferrule to maintain a compression force on the optical fiber end portions causing the optical fiber end portions to become densely packed together while the plastic tube expands in length and protects the optical fiber end portions against damage by the metal ferrule, wherein the initial length of the plastic tube is less than the length of the metal ferrule to allow the plastic tube to expand during crimping of the metal ferrule onto the optical fiber end portions without protruding beyond a back end of the metal ferrule and protruding only slightly beyond a front end of the metal ferrule.

12. The method of claim 11 wherein the plastic tube has an inner diameter (ID) that is determined by the following formula that allows one size plastic tube to be used to make densely packed connector assemblies for multiple fiber optic bundles having different fiber diameters:

$$ID = \text{Fiber Diameter} \times \sqrt{\frac{\text{Number of Fibers}}{\text{Packing Factor}}},$$

wherein the fiber diameter is between 0.010" to 0.120" and the Packing Factor is between 0.92 and 0.75.

* * * * *